United States Patent [19]

Taylor et al.

[11] Patent Number: 5,234,765
[45] Date of Patent: Aug. 10, 1993

[54] HIGH TORQUE AND TENSILE STRENGTH THREADED END FOR THERMOPLASTIC COMPOSITE ROD

[76] Inventors: Scott R. Taylor, 516 Kaw, Bartlesville, Okla. 74003; Warren M. Thomas, P.O. Box 21, Copan, Okla. 74022

[21] Appl. No.: 653,026

[22] Filed: Feb. 8, 1991

[51] Int. Cl.⁵ .................. F16L 39/00; F16B 35/04; D02G 3/00
[52] U.S. Cl. .................. 428/365; 285/149; 411/411; 411/424; 411/908; 428/371; 428/373; 428/377; 428/397; 428/398; 428/399; 428/408; 428/902
[58] Field of Search .............. 428/399, 397, 398, 902, 428/294, 163, 167, 169, 365, 371, 377, 373, 174, 182; 411/411, 424, 908; 285/149

[56] References Cited

U.S. PATENT DOCUMENTS

| | | | |
|---|---|---|---|
| 3,495,494 | 2/1970 | Scott | 411/908 |
| 4,623,290 | 11/1986 | Kikuzawa et al. | 428/399 |
| 4,813,715 | 3/1989 | Policelli | 285/149 |
| 5,083,888 | 1/1992 | Gapp et al. | 411/908 |
| 5,114,290 | 5/1992 | Moghe | 411/908 |

*Primary Examiner*—Jenna L. Davis
*Assistant Examiner*—James D. Withers
*Attorney, Agent, or Firm*—Head & Johnson

[57] ABSTRACT

High tensile and torque strength threads are provided on a thermoplastic composite rod by first cutting a thread at a relatively short pitch into an end of the rod. Thermoplastic composite tape is then wound in tight conformance to the cut thread so that the fibers of the tape align with the desired helix angle of the thread to be created. The rod and the tape are heated at their junction to above melt temperatures during the winding process to increase adhesion between the rod and the tape. While the end of the rod and the wound tape are at above melt temperatures, the end of the rod and the tape are compressed in a die conforming to the desired ultimate configuration of the thread. The tape and rod are then permitted to cool until sufficiently hardened to permit release of the compressing die without deformation of the threaded end of the tape. The result is a thermoplastic composite rod having high tensile and torque strength at its threaded end.

1 Claim, 1 Drawing Sheet

HIGH TORQUE AND TENSILE STRENGTH THREADED END FOR THERMOPLASTIC COMPOSITE ROD

BACKGROUND OF THE INVENTION

This invention relates generally to thermoplastic composites and more particularly concerns threaded end connections for thermoplastic composite rods.

Thermoplastic composites consist of fiber reinforcement embedded in a matrix material. In particular, in pultruded thermoplastic rods, the fiber reinforcement is aligned with the longitudinal axis of the rod. Unidirectional fiber composite rods can also be produced by several other processes including compression molding, thermoforming, etc. Rods made by these processes exhibit very favorable characteristics for strength, weight, fatigue resistance, thermal expansion, and thermal and electric conductivity, all in a medium permitting the reforming of the rod by reheating, bending to a desired shape and cooling.

However, when thermoplastic composite rods are used in applications requiring threaded ends, minimal application of torque or tension at the threaded end results in a failure of the threads and therefore of the rod.

There is at present no method known in the art for producing a thermoplastic pultruded rod with a threaded end able to withstand significant torque and tension.

The present inventors have themselves developed and tested a number of potential solutions to the problem which have produced unsatisfactory results. For example, they have reheated the ends of pultruded thermoplastic composite rods to temperatures above melt temperature of the rod and then compressed the end of the rod in a cold mold to obtain the desired threaded configuration. It was hoped that in this reformation process, the unidirectional fibers would be rearranged to provide strength to the threads. However, the resulting threaded end exhibited a core having high fiber content and threads having a high resin content, resulting in a lack of shear strength in the threads. Application of a tensile force to the threads therefore resulted in a stripping of the high resin threads away from the high fiber rod. The result was a threaded end having virtually no shear strength whatsoever.

In another attempt of solving the problem, the inventors shaved a portion of the end of a rod to produce an end having slightly less diameter than the main portion of the rod. This shaved end was then heated to above melt temperatures and tightly wrapped with a thermoplastic composite tape simultaneously heated to above melt temperatures. It was hoped that the helical relationship of the unidirectional fibers of the tape in relation to the axial unidirectional fibers of the rod would eliminate shear problems resulting from a lack of fiber in the threads. However, it was found that only the flow of resin causing the tape resin and rod resin to bond together held the tape to the rod. As a result, while this attempt provided a threaded end displaying better tensile strength, there was no significant improvement and the threads again sheared from the rod.

The inventors also attempted to cut threads into the end of a rod with a die, thus maintaining fiber within the threads, the fibers then being cut at the exterior surfaces of the threads. The resulting thread was then heated to above melt temperature and compressed to seal the cut surfaces. This was found to provide improved tensile strength, but, probably because the threads were cut, the threaded end was unable to withstand any significant amount of torque.

It is therefore, an object of the present invention, to provide a pultruded thermoplastic composite rod having a threaded end capable of withstanding high torque and tensile forces as well as to provide a method by which threaded ends may be post-formed in any thermoplastic composite rod.

SUMMARY OF THE INVENTION

In accordance with the invention, high tensile and torque strength threads are provided on a thermoplastic composite rod by first cutting the thread at a relatively short pitch into the end of the rod. Thermoplastic composite tape is then wound in tight conformance to the cut thread so that the fibers of the tape align with the desired helix angle of the thread to be created. The rod and the tape are heated at their junction to above melt temperatures during the winding process to increase adhesion between the rod and the tape. While the end of the rod and the wound tape are at above melt temperatures, the end of the rod and the tape are compressed in a die conforming to the desired ultimate configuration of the thread. The tape and rod are then permitted to cool until sufficiently hardened to permit release of the compressing die without deformation of the threaded end of the tape. The result is a thermoplastic composite rod having high tensile and torque strength at its threaded end.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
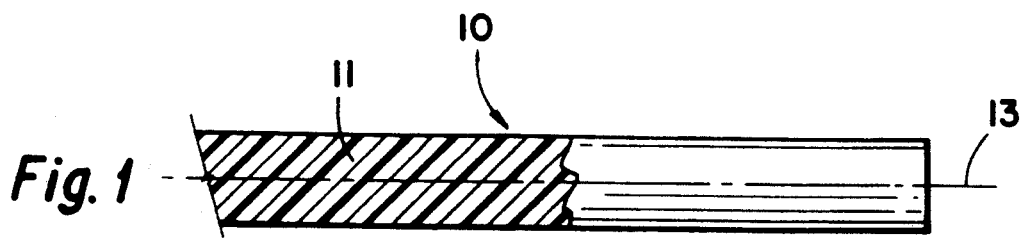
FIG. 1 is a cross-sectional view of a length of unidirectional thermoplastic composite rod.
Figure 2:
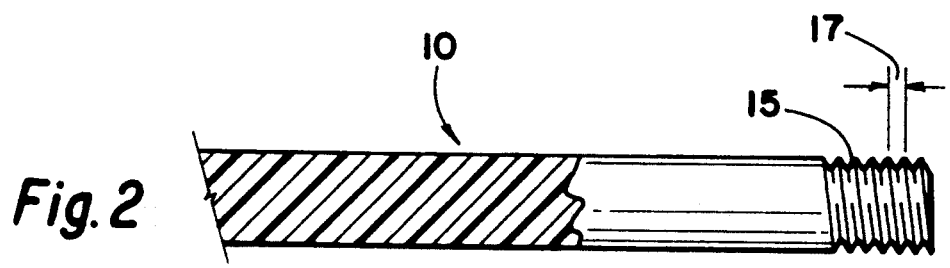
FIG. 2 is a cross-sectional view of the rod of FIG. 1 with one end cut to form a thread.

Turning first to FIG. 1, a thermoplastic composite rod 10 is illustrated showing its unidirectional fibers 11 extending parallel to its longitudinal axis 13. In forming a high torque and tensile strength threaded end for the rod 10, the end of the rod is first cut to provide a first threaded end 15 having a pitch 17 significantly less than the ultimately intended pitch 19 of the threaded end of the rod 10. The resulting first pitch 17 threaded end of the rod 10 is illustrated in FIG. 2.

Figure 3:
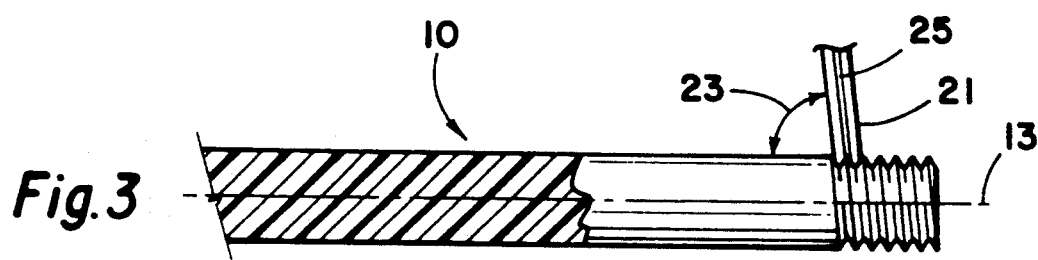
FIG. 3 is a cross-sectional view of the rod of FIG. 2 illustrating the wrapping of the cut end with tape.
Figure 4:
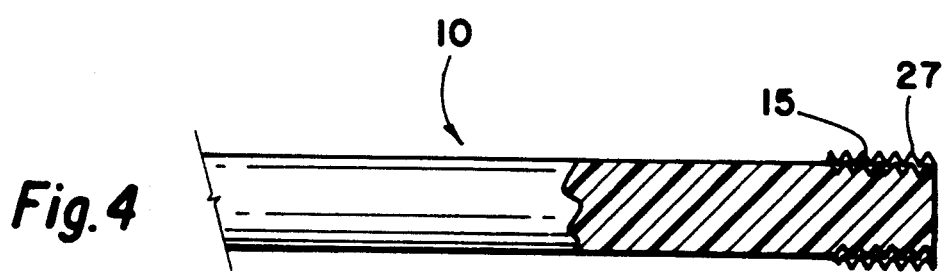
FIG. 4 if a cross-sectional view of the rod of FIG. 3 with the wrapping completed.
Figure 5:
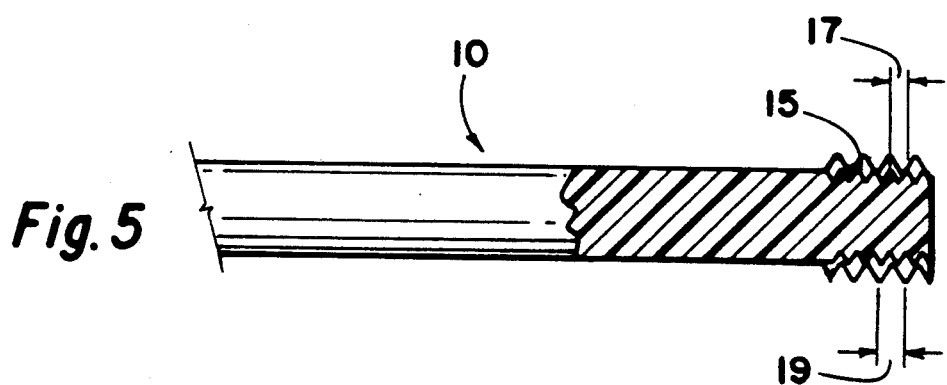
FIG. 5 is a cross sectional view of the final threaded end of the thermoplastic composite rod formed by the method of the present invention.

The end of the rod 10 is then heated to temperatures above the melt temperature of the resin in the rod 10. At the same time, as shown in FIG. 3, thermoplastic composite tape 21 is wound about the first threaded end 15 of the rod 10 by rotating the rod 10 about its longitudinal axis 13 with the tape 21 disposed at a helical angle 23 to the rod 10 substantially aligned with the desired helical angle of the final thread. Thus, the helically arranged fibers 25 of the tape 21 are interspersed among the longitudinal fibers 11 of the rod 10. The result is a threaded end 27 on the rod 10 substantially conformed to the first thread 15 cut into the rod 10 as can best be seen in FIG. 4.

With the tape 21 and the threaded end of the rod 10 at above melt temperatures, the tape 21 and the threaded end of the rod 10 are compressed in a die conformed to the ultimate configuration of the thread to reform the taped end of the rod 10 to the desired threaded configuration.

It was found that, given rods of similar cross section, when loads were applied to threaded ends formed simply by reheating and compression, tensile load failure occurred at approximately 55 pounds while torque failure occurred at 5 foot pounds. Threaded ends formed by the shaving process were found to fail under tensile loads of approximately 75 pounds and under 5 foot pounds of torque. Comparatively, threads formed by the cutting and resealing method were found to fail under tensile loads in the range of 225 pounds, but were still unable to withstand more than 5 foot pounds of torque. However, the threaded ends of thermoplastic composite rods formed in accordance with the process of the present invention were found to withstand tensile loads of in excess of 400 pounds. At present, tests have not been conducted for tensile loads much greater than 400 pounds, so it is not known what maximum tensile loads may actually be supported by threaded ends formed according to this process. Most significantly, however, it has been determined that threads formed according to this process are able to withstand at least 30 foot pounds of torque in comparison to the 5 foot pounds of torque which produced failure in the threads of other rods of similar diameter.

Thus, it is apparent that there has been provided, in accordance with the invention, an erosion retarder that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A fiber reinforced thermoplastic composite rod having a high tensile and torque strength threaded end of final pitch and final helix angle comprising:
    a thermoplastic composite rod having a thread cut into an end portion thereof at an initial pitch less than said final pitch; and
    a section of thermoplastic composite tape tightly wound about said thread while said tape and said thread are within their softening temperature range, said tape having its fibers substantially in alignment with said final helix angle;
    said high strength threaded end being formed by compressing said wound tape and rod while in said softening temperature range in a die conforming to the desired configuration of said high strength threaded end.

* * * * *